(12) United States Patent
Cocchi et al.

(10) Patent No.: US 7,970,138 B2
(45) Date of Patent: Jun. 28, 2011

(54) METHOD AND APPARATUS FOR SUPPORTING BROADCAST EFFICIENCY AND SECURITY ENHANCEMENTS

(75) Inventors: Ronald P. Cocchi, Seal Beach, CA (US); Frances C. McKee-Clabaugh, San Pedro, CA (US)

(73) Assignee: SypherMedia International, Aliso Viejo, CA (US)

( * ) Notice: Subject to any disclaimer, the term of this patent is extended or adjusted under 35 U.S.C. 154(b) by 1372 days.

(21) Appl. No.: 11/441,888

(22) Filed: May 26, 2006

(65) Prior Publication Data
US 2007/0286422 A1 Dec. 13, 2007

(51) Int. Cl.
*H04N 7/167* (2011.01)
(52) U.S. Cl. ........ 380/200; 380/201; 380/202; 380/212; 380/44
(58) Field of Classification Search .................. 380/212, 380/228, 239, 43; 725/25, 27, 28, 31, 125; 713/172
See application file for complete search history.

(56) References Cited

U.S. PATENT DOCUMENTS

| | | | |
|---|---|---|---|
| 4,757,534 A | 7/1988 | Matyas et al. | |
| 5,790,663 A | 8/1998 | Lee et al. | |
| 5,940,504 A | 8/1999 | Griswold | |
| 6,240,401 B1 | 5/2001 | Oren et al. | |
| 6,243,468 B1 | 6/2001 | Pearce et al. | |
| 6,285,774 B1 | 9/2001 | Schumann et al. | |
| 6,373,948 B1 * | 4/2002 | Wool ........................... | 380/241 |
| 6,550,011 B1 | 4/2003 | Sims, III | |
| 6,681,212 B1 | 1/2004 | Zeng | |
| 6,744,892 B2 * | 6/2004 | Akins et al. ................... | 380/241 |
| 6,931,545 B1 | 8/2005 | Ta et al. | |
| 6,957,344 B1 | 10/2005 | Goldshlag et al. | |
| 7,007,170 B2 | 2/2006 | Morten | |
| 7,295,681 B2 | 11/2007 | Lubin et al. | |
| 7,328,345 B2 | 2/2008 | Morten et al. | |
| 7,356,143 B2 | 4/2008 | Morten | |
| 7,376,233 B2 | 5/2008 | Candelore et al. | |
| 2002/0021805 A1 | 2/2002 | Schumann et al. | |
| 2002/0067914 A1 | 6/2002 | Schumann et al. | |

(Continued)

FOREIGN PATENT DOCUMENTS

WO    WO 99/43120    8/1999

(Continued)

OTHER PUBLICATIONS

Cinea press release "Cinea, Inc. to Provide IFE Key Management Servies for Universal Pictures and Twentieth Century Fox" Sep. 9, 2003.

(Continued)

*Primary Examiner* — Hosuk Song
*Assistant Examiner* — Chi Nguy
(74) *Attorney, Agent, or Firm* — Gates & Cooper LLP

(57) ABSTRACT

A method and apparatus for providing conditional access to media programs is described. An exemplary method comprising the steps of transmitting media information encrypted according to a control word (CW) to a receiver station, transmitting entitlement management information (EMI) to the receiver station, the EMI comprising a service bitmap, and transmitting entitlement control information (ECI) to the receiver station, the entitlement control information including the control word (CW) encrypted according to a key (K) and an index to an element of the service bitmap, wherein the control word (CW) is decrypted by the receiver stations according to a value of the indexed element of the service bitmap.

41 Claims, 11 Drawing Sheets

U.S. PATENT DOCUMENTS

| | | | |
|---|---|---|---|
| 2002/0094084 A1 | 7/2002 | Wasilewski et al. | |
| 2003/0046568 A1 | 3/2003 | Riddick et al. | |
| 2003/0206631 A1* | 11/2003 | Candelore | 380/210 |
| 2004/0010717 A1 | 1/2004 | Simec et al. | |
| 2004/0034582 A1 | 2/2004 | Gilliam et al. | |
| 2004/0039704 A1 | 2/2004 | Gilliam et al. | |
| 2004/0078575 A1 | 4/2004 | Morten et al. | |
| 2004/0107356 A1 | 6/2004 | Shamoon et al. | |
| 2004/0133803 A1 | 7/2004 | Rabin et al. | |
| 2004/0177369 A1* | 9/2004 | Akins, III | 725/31 |
| 2004/0184616 A1 | 9/2004 | Morten | |
| 2004/0205812 A1* | 10/2004 | Candelore | 725/31 |
| 2005/0005098 A1 | 1/2005 | Michaelis et al. | |
| 2005/0172122 A1 | 8/2005 | Risan et al. | |
| 2005/0259812 A1* | 11/2005 | Chen | 379/431 |
| 2005/0278257 A1 | 12/2005 | Barr et al. | |
| 2006/0005253 A1 | 1/2006 | Goldshlag et al. | |
| 2006/0010500 A1 | 1/2006 | Elazar et al. | |
| 2006/0101287 A1 | 5/2006 | Morten | |
| 2006/0107285 A1* | 5/2006 | Medvinsky | 725/25 |
| 2006/0123246 A1* | 6/2006 | Vantalon et al. | 713/189 |
| 2006/0143481 A1 | 6/2006 | Morten | |
| 2006/0159303 A1 | 7/2006 | Davis et al. | |
| 2006/0239503 A1 | 10/2006 | Petrovic et al. | |
| 2006/0294018 A1* | 12/2006 | Tuoriniemi | 705/59 |
| 2007/0033419 A1 | 2/2007 | Kocher et al. | |
| 2007/0143854 A1* | 6/2007 | Wasilewski | 726/26 |
| 2008/0279379 A1* | 11/2008 | Muijen | 380/228 |

FOREIGN PATENT DOCUMENTS

| | | |
|---|---|---|
| WO | 02/01333 A2 | 1/2002 |
| WO | WO02/01333 | 1/2002 |
| WO | WO2005/106621 | 11/2005 |

OTHER PUBLICATIONS

DRM Watch Magazine Article "Cinea DRM for DVDs Endorsed for Oscar Screeners", Jul. 8, 2004.

* cited by examiner

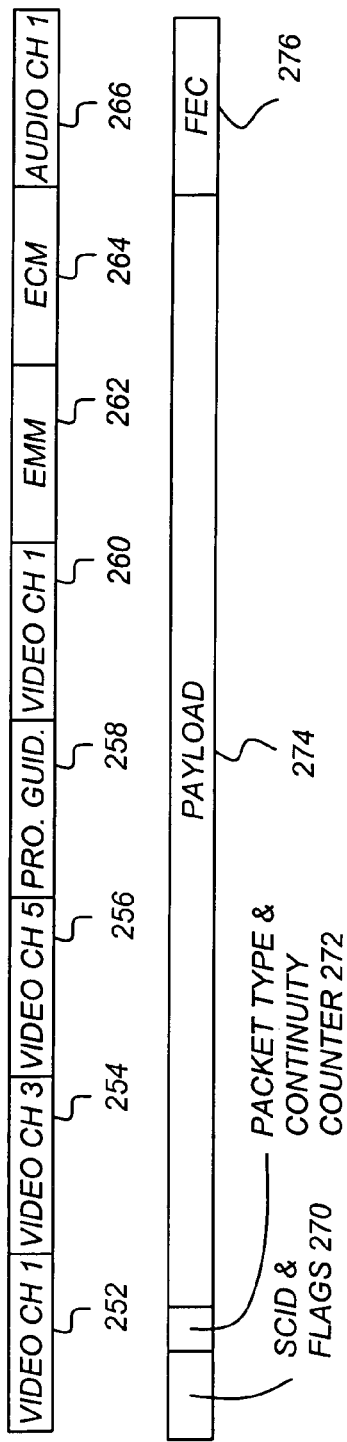
FIG. 2A
FIG. 2B
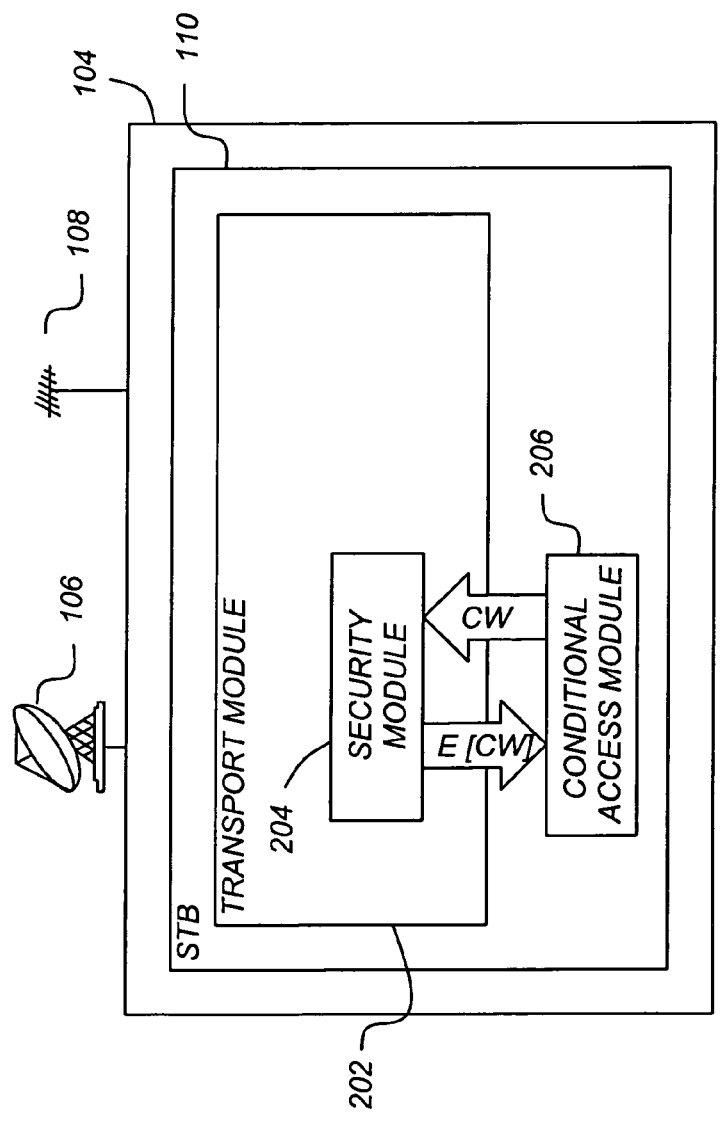
FIG. 2C

METHOD AND APPARATUS FOR SUPPORTING BROADCAST EFFICIENCY AND SECURITY ENHANCEMENTS

CROSS-REFERENCE TO RELATED APPLICATIONS

This application is related to U.S. Patent Application US2005/037197, entitled METHOD AND APPARATUS FOR SUPPORTING MULTIPLE BROADCASTERS INDEPENDENTLY USING A SINGLE CONDITIONAL ACCESS SYSTEM," by Ronald P. Cocchi, Gregory J. Gagnon, and Dennis R. Flaharty, and filed Oct. 18, 2005, which claims benefit of U.S. Provisional Patent Application No. 60/619,663, entitled "METHOD OF SUPPORTING MULTIPLE BROADCASTERS INDEPENDENTLY USING A SINGLE CONDITIONAL ACCESS SYSTEM," by Ronald P. Cocchi, Gregory J. Gagnon, and Dennis R. Flaharty, filed Oct. 18, 2004, which application is hereby incorporated by reference herein.

BACKGROUND OF THE INVENTION

1. Field of the Invention

The present invention relates to systems and methods for providing conditional access to media programs, and in particular to a system and method for providing for conditional access entitlement and control information to subscribers in a digital video broadcasting (DVB) environment.

2. Description of the Related Art

For many years, media programs such as television and radio programs have been broadcast to viewers/listeners free of charge. More recently, this free-of-charge dissemination model has been augmented with a fee-for-service and/or fee-for-view model in which paying subscribers are provided access to a greater variety and number of media programs, including video programs, audio programs and the like, by cable, satellite and terrestrial broadcasts.

However, while subscriber-based services are readily available in some areas, they are not available on a worldwide basis. Further, in current media program subscription business models, subscribers are typically offered services from a small number of providers (e.g. DIRECTV or ECHOSTAR, or the approved local cable provider) each of which typically provide a large number of media channels from a variety of sources (e.g. ESPN, HBO, COURT TV, HISTORY CHANNEL). To assure that only subscribers receive the media programs, each service provider typically encrypts the program material and provides equipment necessary for the customer to decrypt them so that they can be viewed.

One of the roadblocks to the evolution of such services is the means by which the service provider assures that only paying customers receive their media programs. Existing conditional access systems were initially developed for small markets and grew to larger markets over a long period of time. This growth has attributed to the success of the pay TV industry but has come at some cost to the conditional access infrastructure. Designs initially conceived in smaller systems do not scale well as the once small system with relatively few subscribers became large with millions of subscribers. As a result, the distribution and renewal of Entitlement Management Information (EMI) (typically, in a message called an Entitlement Management Message (EMM)) that are required to renew their services used for viewing has become inefficient. Further, when sending these renewals, current conditional access systems fail to add a cryptographic component to the renewal process, thus exposing the conditional access system to hacking and compromise.

What is needed is a simple, efficient means to securely distribute EMI. The present invention satisfies these needs.

SUMMARY OF THE INVENTION

To address the requirements described above, the present invention discloses a method, apparatus, article of manufacture for providing conditional access to media programs. In one embodiment, the invention is described by a method comprising the steps of transmitting media information encrypted according to a control word (CW) to a receiver station, transmitting entitlement management information (EMI) to the receiver station, the EMI comprising a service bitmap, and transmitting entitlement control information (ECI) to the receiver station, the entitlement control information including the control word (CW) encrypted according to a key (K) and an index to an element of the service bitmap, wherein the control word (CW) is decrypted by the receiver stations according to a value of the indexed element of the service bitmap and/or by processing the entire services bitmap.

In another embodiment, the invention is described by an apparatus for providing conditional access to media programs, the apparatus comprising a first encryptor for encrypting media information according to a control word (CW), a second encryptor for encrypting the control word according to a key (K), processor for generating entitlement management information (EMI), including a service bitmap and for generating entitlement control information (ECI) including the encrypted control word (CW) and an index to an element of the service bitmap, a transmitter for transmitting the entitlement management information (EMI) in a first message and for transmitting the entitlement control information (ECI) in a second message, wherein the control word (CW) is decrypted by the receiver stations according to a value of the indexed element of the service bitmap. The foregoing permits the transmission and reception of media programs while significantly reducing the bandwidth required to distribute renewal messages. Since the number of EMMs required to send EMI to subscribers to is substantially reduced, the present invention permits the transmission of many more messages without increasing throughput or bandwidth requirements, thus allowing subscriber entitlement information to be updated for individual subscribers or small groups of subscribers (via positive addressing, for example). The present invention allows provision of additional security by the addition of a cryptographic component to the EMI renewal process. In one embodiment, the present invention also describes a unique method by which the key that is used to encrypt the media programs is generated instead of being explicitly included as a field in the ECM. The present invention also allows broadcasters to allocate additional broadcast capacity to other revenue-bearing services.

BRIEF DESCRIPTION OF THE DRAWINGS

Referring now to the drawings in which like reference numbers represent corresponding parts throughout:

FIGS. 2A and 2B are diagrams of a representative data stream and the packets produced by the media program distribution system;

FIG. 2C is a diagram of a typical subscriber station;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
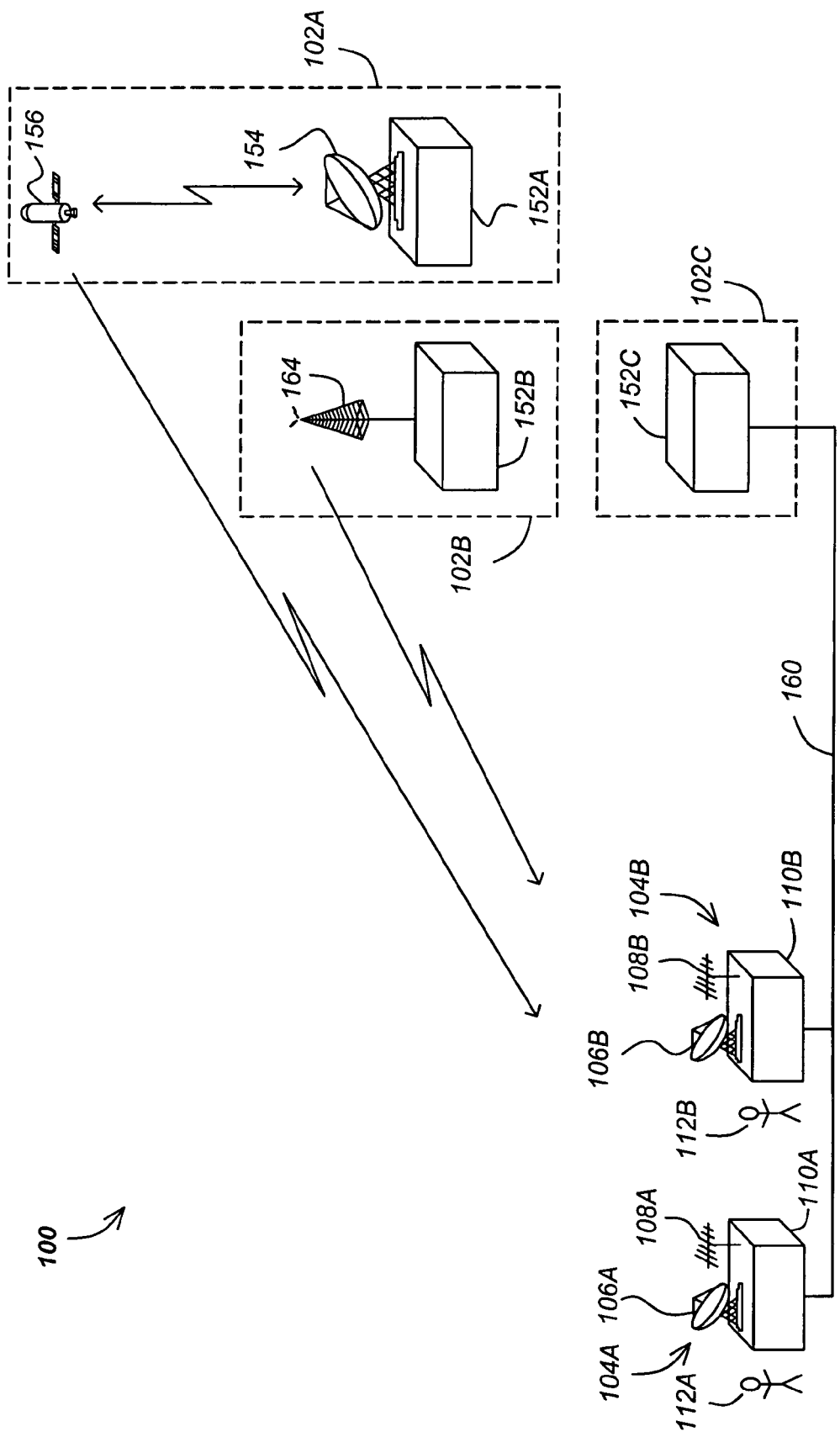
FIG. 1 is a diagram illustrating a media program distribution system.

FIG. 1 is a diagram illustrating a media program distribution system 100. The system 100 includes a plurality of service providers (hereinafter alternatively referred to as broadcasters) 102, including a first service provider 102A that broadcasts media programs from a satellite broadcast facility 152A via one or more uplink antennas 154 and one or more satellites 156, a second service provider 102B, that broadcasts media programs from terrestrial broadcast facility 152B and one or more terrestrial antennas 164, and a third service provider 102C that broadcasts media programs from cable broadcast facility 152C via a cable link 160.

The system 100 also comprises a plurality of subscriber stations 104A, 104B (alternatively referred to hereinafter as subscriber station(s) or receiving station(s) 104), each providing service to one or more subscribers 112A and 112B (alternatively referred to hereinafter as subscribers 112). Each subscriber station 104A, 104B may include a satellite reception antenna 106A, 106B (alternatively referred to hereinafter as satellite reception antenna 106) and/or a terrestrial broadcast antenna 108A, 108B (alternatively referred to hereinafter as terrestrial broadcast antenna 108) communicatively coupled to a receiver 110A, 110B (alternatively referred to hereinafter as receiver(s) 110, set top box(es) (STBs), or integrated receiver/decoder(s) (IRDs)).

Broadcast Data Stream Format and Protocol

FIG. 2A is a diagram of a representative data stream. The data stream comprises a plurality of packets combined by time division multiple access (TDMA) techniques, with each packet identified by a system channel identifier or SCID.

The first packet segment 252 comprises information from a first video channel (for a first media program). Packet segment 254 comprises information relevant for a second video channel (for a second media program). Packet segment 256 comprises information from video channel 5 (for yet another media program). Packet segment 258 comprises program guide information such as the information provided by the program guide subsystem. Packet 260 comprises additional first media channel information. Packet 262 includes an entitlement management message (EMM) 262, which carries entitlement management information that is used by the receiving station 104 to determine whether the user is permitted to view or record media programs on one or more of the media channels, as described further below. Packet 266 includes the audio information for the media program transmitted on video channel 1. The data stream includes a packet with an entitlement control message (ECM) 264. The ECM is also used to determine whether the user is permitted to view or record the media programs on the media channels, as described below.

The data stream therefore comprises a series of TDMA packets from a number of data sources. The data stream is modulated and transmitted on a frequency band to the satellite via the antenna 154. The receiving station 104 receives these signals via the antenna 106, and using the system channel identifier (SCID) described below, reassembles the packets to regenerate the program material for each of the channels.

FIG. 2B is a diagram of a data packet. Each data packet (e.g. 252-266) comprises a number of packet segments. The first packet segment 270 comprises two bytes of information containing the SCID and flags. The SCID is a unique 12-bit number that uniquely identifies the data packet's data channel. The data channel includes the information that is required to reproduce the media program at the receiver station. For example, since the video for channel 1 is in packets 252 and 260 of the data stream, and the audio for channel 1 is in packet 266, each of these packets will have the same SCID. Also, although the EMM transmits entitlement information related to more than one media program, the ECM typically includes information relating to only one media program and is transmitted with the same stream as the media program as well.

The flags include 4 bits that are used to control other features. The second packet segment 272 is made up of a 4-bit packet type indicator. The packet type identifies the packet by data type (video, audio, ECM, etc.). When combined with the SCID, the packet type determines how the data packet will be used. The next packet segment 274 comprises 127 bytes of payload data, which in the cases of packets 252 is a portion of the video program provided by the video program source. The final packet segment 276 is data required to perform forward error correction.

FIG. 2C is a diagram of a typical subscriber station 104. Each station 104 includes at least one receiver or STB 110, which itself includes a transport module 202 that communicates with a conditional access module (CAM) 206. In one embodiment, the CAM 206 is a smart card that is removably communicatively coupleable to the transport module 202 and hence, the STB 110. In another embodiment, the CAM 206 is a device such as a chip or a collection of devices that are physically integrated with the STB 110 and irremovable. To assure that only those who subscribe to the service are provided with media programs, the service providers typically encrypt the media program M with a control word CW, thus producing an encrypted program $E_{CW}[M]$, and transmit the encrypted media program $E_{CW}[M]$ and an encrypted version of the control word $E_K[CW_i]$ to the receiver 110. The receiver 110 receives both the encrypted program $E_{CW}[M]$ and the encrypted control word $E_K[CW_i]$. The transport module 202 analyzes the incoming data stream and passes the encrypted control word $E_K[CW_i]$ to the CAM 206, which decrypts the control word $CW_i$ and returns the decrypted control word $CW_i$ to a security module 204 or similar device in the transport module 202. The security module 204 then uses the control word $CW_i$ to decrypt the encrypted media program $E_{CW}[M]$ to produce the media program M for presentation to the subscriber. This system assures that only those who are in possession of a valid CAM 206 can receive and decode media programs. However, it does not prevent the use of the CAM 206 in any other STB 110. Hence, if the CAM 206 is compromised or duplicated, unauthorized access to media programs is possible.

Figure 3:
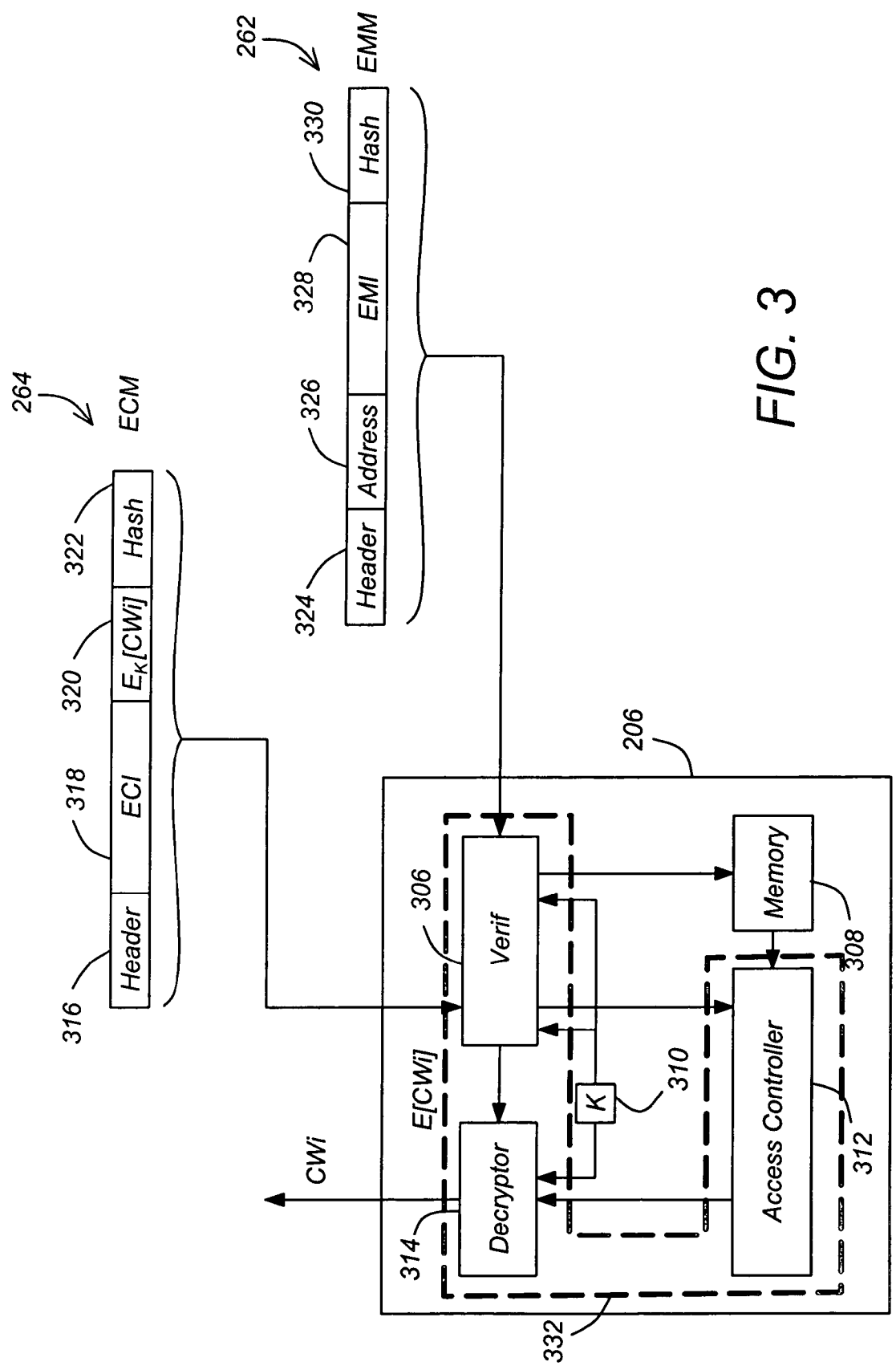
FIG. 3 is a diagram illustrating how a conditional access module decrypts an encrypted control word.

FIG. 3 is a diagram illustrating further details regarding how the CAM 206 decrypts the encrypted control word $E_K[CW_i]$. Entitlement control information (ECI) 318 and entitlement management information (EMI) 328 are provided to the CAM 206 in an entitlement control message (ECM) 264 and an entitlement management message (EMM) 262, respectively. Typically, the ECM 264 and the EMM 262 are transmitted by the broadcaster or media program provider 102, in a single data stream, but separate packages and received by the STB or receiver 110. The ECM 264 typically comprises a header 316, ECI 318, an encrypted control word $E_K[CW_i]$ 320 and a hash value 322. The EMM 262 typically comprises a header 324, an address 326, EMI 328 that defines what services or programs the subscriber is permitted access to, and a hash value 330.

In one embodiment, the ECM 264 and EMM 262 are provided to a verifier 306 for authentication purposes before further use. Authentication can be accomplished in a number of ways. For example, the ECM 264 may include a hash 322 of the access conditions 318, generated using the same key (K) that is used to encrypt the control word (CW). In this case, the verifier 306 uses the locally stored key (K) 310 to compute a hash of the access conditions 318, and compares the result with the hash 322 value in the ECM 264. If the computed and recited hash compare favorably, the access conditions 318 are verified, and the ECM 264 is authenticated for use. The same technique can be used to verify the encrypted control word $E_K[CW_i]$ 320 and the access information 328 as well (e.g. by comparison of the hash 330 received in the EMM 262 and a hash computed using the key 310).

Although FIG. 3 illustrates a single verifier 306, the ECM 264 and the EMM 262 can be verified by different verifiers, and using different keys if desired. Also, the access controller 312, verifier 306 and decryptor 314 may be implemented by a single processor 332 or different, perhaps special purpose processors. Once verified, the access information 328 from the EMM 262 is stored in storage 308 and made available to the access controller 312.

In another embodiment, the control word $CW_i$ and the access control information 318 can be encrypted according to the key (K) (resulting in $E_K[CW_i+ACI]$ or $E_K[CW_i]$ and $E_K[ACI]$). In this case, the access control information ACI is decrypted by the decryptor 314, sent to the access controller 312 where it is compared to the entitlement management information stored in memory 308. If the comparison indicates that the media program should be made available to the subscriber, the access controller instructs the decryptor 314 to decrypt the encrypted control word $E_K[CW_i]$ to produce the control word $CW_i$, and the control word $CW_i$ is used to decrypt the media program.

The access controller 312 compares the access condition information 318 with the access entitlement information 328 to determine if the subscriber should have access to the media program that was encrypted with the control word $CW_i$. If so, the access controller 312 instructs the decryptor 314 to decrypt the encrypted control word $E_K[CW_i]$ using key 310 to produce the control word $CW_i$. The STB 110 uses the control word to decrypt the media program.

Existing conditional access systems were initially developed for small markets and grew to larger markets over a long period of time. This growth has attributed to the success of the Pay TV industry but has come at some cost to the conditional access infrastructure. The design initially conceived in the smaller system did not scale well as the once small system with relatively few subscribers became large with millions of subscribers.

As described above, EMMs 262 can be used to extend the service authorization period for paid programming services stored on a subscriber's conditional access module 206. This can be accomplished by pushing the expiration date forward in time or generating new EMMs 262 for each service and sending them to the conditional access module 206. These EMMs 262 can be delivered to the conditional access module 206 using positive addressing. This permits the message to be addressed to a single smart card (unique addressing) or to a group of cards (group addressing).

Group addressing can be used to send an updated or new EMM 262 to the CAMs 206 of subscribers who have subscribed to a particular service. However, group addressing is typically less effective since the group size is usually too small compared to the large number of subscribers that are subscribed to many services. Small groups also become less effective because the CAMs 206 of the subscribers in the group may no longer be used due to the CAM 206 failure or the subscriber 112 ending their service.

Unique addressing (sending renewal EMMs 262 by individual service separately to each CAM 206) is also extremely inefficient. For example, if a broadcaster had 20 million smart cards in the field and each card had 30 services, the broadcaster would be required to send 600 million EMMs 262 to renew the services for all CAMs 206 and services on the CAMs 206. This is extremely expensive in terms of bandwidth that could be used for other purposes including offering additional pay services.

With large subscriber populations, a significantly more efficient method of distributing service data and renewals is desired, particularly when using positive addressing to distribute information to a group of subscribers 112. As described below, this can be accomplished by transmitting a service bitmap for the services stored on a CAM 206.

In one embodiment, each service offered by a broadcaster is represented by a single element in an array of single-bit elements, known as a service bitmap. The ECM 264 contains a service authorization index or program ID indicating which service must be present on the CAM 206 for the CAM 206 to be able to generate the control word $CW_i$ and thereby decrypt the media program (M). The CAM 206 maps the service or program ID into a specific element or bit position in the array or bitmap using the index. If the value of the array element is a "1", the CAM 206 can attempt to generate the control word. If the value of the array element is a "0" then the smart card will not attempt to generate the control word $CW_i$.

In another embodiment, each of the elements in the array of elements that together comprise the service bitmap 400 can represent a subscriber and the value of a bit associated with that element indicates whether that subscriber is authorized to receive (subscribe to) a particular media service. For example, if there are 20 million subscribers to a general broadcast service, but only 5 million subscribers to a particular media service (e.g. a particular channel or pay-per-view event), the EMM 262 authorizing that media service would comprise an array of elements, each having a value of a "1" (indicating that the subscriber is authorized to receive the service), or a "0" (indicating that the subscriber is not authorized to receive the service). Using service map, the broadcaster can send group based EMMs authorizing a specific service ID which would be addressed to specific groups of cards instead of an individual card. Card groups can be identified based on a subset of their card ID. For example, if the card ID is a 4 byte alphanumeric, the card group could consist of all cards that share the high order three bytes of the 4 byte Card ID.

A service bitmap 400 may be generated for each CAM 206. The number of EMMs 262 generated in our example above is 20 million instead of 600 million as in the case of generating an EMM 262 for every subscriber's CAM 206 and every service. As described below, a signature can be added over the bitmap 400 for additional security. The access controller 312 can also check the expiration date of the service bitmap 400, if one is provided. In this embodiment, the signature and the revised expiration date is transmitted to the CAM 206 along with the service bitmap. This significant reduction in the number of EMMs 262 (in terms of the number of EMM 262 messages sent and in total number of bytes transmitted) allows the renewal period to be shorter, which allows tighter control over the maintenance of the services (including updating and canceling such services).

The use of a service bitmap also allows the use of negative addressing to remove services associated with bits that may have been set by an attacker. It also saves a significant amount of memory space within the CAM 206 compared to previously deployed systems, because each service requires only one bit as opposed to several bytes with an associated expiration date. While existing CAM 206 can store data for only about 100 services, the storage efficiency provided by the bitmap allows thousands of services to be stored on a single CAM 206. The service bitmap also enables proposed a-la-carte services to be supported by the CAM 206.

Figure 4:
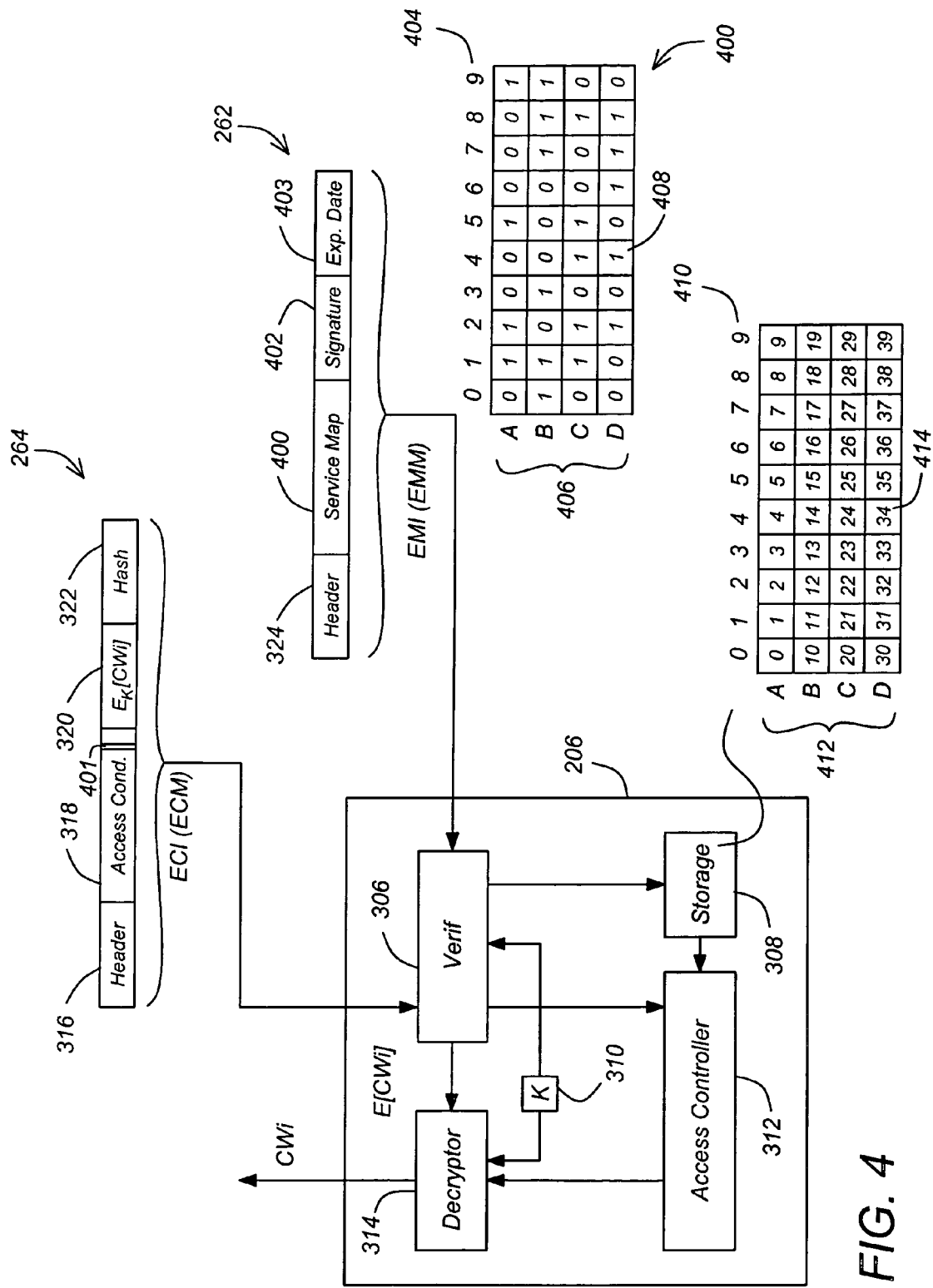
FIG. 4 is a diagram illustrating the transmission of EMI via a service bitmap.

FIG. 4 is a diagram illustrating an embodiment of the invention in which the EMI 328 is transmitted via a service bitmap 400. The service bitmap 400 comprises an array of elements such as element 408. Each element 408 is associated with a media program or a media service, and is used to indicate whether the subscriber 112 is entitled to view the media program or service. The elements 408 may be arranged in columns 404 (e.g. columns 1-9 shown in FIG. 4) and rows 406 (e.g. rows A-D shown in FIG. 4). Each element could represent one or more individual services. In the illustrated embodiment, the service bitmap 400 is an array of bits, and each element 408 represents a bit with a value of either one or zero.

The ECM 264 includes access control information (ECI) 318 for the media programs or services. In one embodiment, the ECI 318 includes an index 401 to an element 408 of the service bitmap 400. The index 401 indicates where the entitlement management information 328 related to the applicable media program or service may be found in the service bitmap 400. That is, which element 408 of the service bitmap 400 holds the value indicating the subscriber's entitlement to view the associated media program or service.

For example, in one embodiment, an index 401 value of "34" or "4D" accompanying or associated with the media program indicates that the logical value of the 34$^{th}$ element of the service bitmap 400 (or 4$^{th}$ column and row D) is to be used to determine if the subscriber is entitled to view the program or service that was encrypted by the (encrypted) control word E[CW$_i$] 320 transmitted in the ECM 264. In the example shown in FIG. 4, the value of the service bitmap for element 34 is a "1", thus indicating that the subscriber is entitled to receive the service or program. In one embodiment, the foregoing is implemented by comparing the service bitmap 400 with an identically dimensioned mask.

In the foregoing example, the service bitmap 400 provided a direct mapping to entitlements (e.g. a "1" indicated that the subscriber was entitled to receive the service). Other, ostensibly more secure embodiments are possible. For example, the service bitmap may be hashed according to the key 310 before transmission, and the hashed service bitmap used to determine whether the subscriber is entitled to receive the media program or service, or hashed again to recover the service bitmap 400. A logical exclusive OR (XOR) of the service bitmap element values and elements of an identically dimensioned array may also be used to determine whether the user is entitled to receive the service or program.

The service bitmap 400 may also be digitally signed before transmission to the STB 110 to assure that it has not been compromised. This can be accomplished by hashing (e.g. computing a digest of) the service bitmap 400, signing the message by using the key (K) 310 or a private key to encrypt the digest, and sending the resulting signature 402 along with the service bitmap 400. The key (K) 310 or the public key of the sender can be used to decrypt the data and validate the signature, thus providing the digest. This is compared to the locally computed digest of the message, and if they match, allowing the service bitmap 400 to be used. The signature and the message can also together be encrypted before sending to the receiver station 104 and then decrypted, to secure not only the integrity of the service bitmap, but its privacy as well. These operations can be performed by the verifier(s) 306 shown in FIG. 4.

The EMM 262 may also include an expiration date 403 indicating a date (and optionally, a time) after which the service bitmap 400 is no longer in force. The expiration date 403 may also be signed to assure it is not tampered with before it is received in the CAM 206. Although FIG. 4 illustrates the entire service bitmap 400 being transmitted in a single EMM 262, the service bitmap 400 may be sent piecemeal in portions known as service blocks. Service blocks can be large, having data for several hundred services, or small, with data for only tens of services. All services within a transmitted service block share the same expiration date 403, which is transmitted with the service bitmap 400 in the EMM 262. The choice of service block size is largely a function of system-level parameters, and is selected by the broadcaster to optimize transmission in light of such parameters.

The use of a bitmap 400 to transmit entitlement information also ameliorates CAM 206 storage requirements associated with blackouts. The CAM 206 may have a separate set of service bitmaps 400 that are used in determining whether the subscriber in possession of the CAM 206 resides in a broadcast area that is authorized to view a particular service.

As described above, the encrypted control word $E_K[CW_i]$ 320 is transmitted to the receiving station 104 in an 8 byte portion of the ECM 264. Most systems encrypt the $CW_i$ using some form of global key (K), as described in FIG. 3. This is vulnerable to attacks by obtaining the global key (K) and disseminating it to non-subscribers. An unauthorized CAM 206 could successfully decrypt the media program (M) by receiving the global key (K) using it to decrypt the encrypted control word $E_K[CW_i]$ 320 as it was extracted in real time from the ECM 264.

To make the process of deciphering the $CW_i$ significantly more secure, one embodiment of the present invention generates the encrypted control word to include the access information 318 (e.g. $E[CW_i+AC]$). This pairs the control word and the access conditions 318, making each more difficult to tamper with. Alternatively, the entire ECM 264 may be encrypted and incorporated into the CW generation, forcing the receiver to process and decrypt data from the entire ECM 264. This has at least two benefits. First, the ECM 264 cannot be modified or it will certainly generate the wrong $CW_i$. Second, the entire ECM 264 must be accepted (and processed), rather than getting or generating a global transmission key from only one 8 byte field to produce the control word $CW_i$. Requiring the CAM 206 to process the entire ECM 264 may result in positive and/or negative actions that could affect an unauthorized CAM 206, thus improving the security of the conditional access system.

The service bitmap 400 may be related to the key (K) 310, to prevent the service bitmap and index 401 from being tampered with. This can be implemented by generating the key (K) 310 at least in part from the service bitmap 400 or generating the service bitmap 400 at least in part from the key (K).

Figure 5:
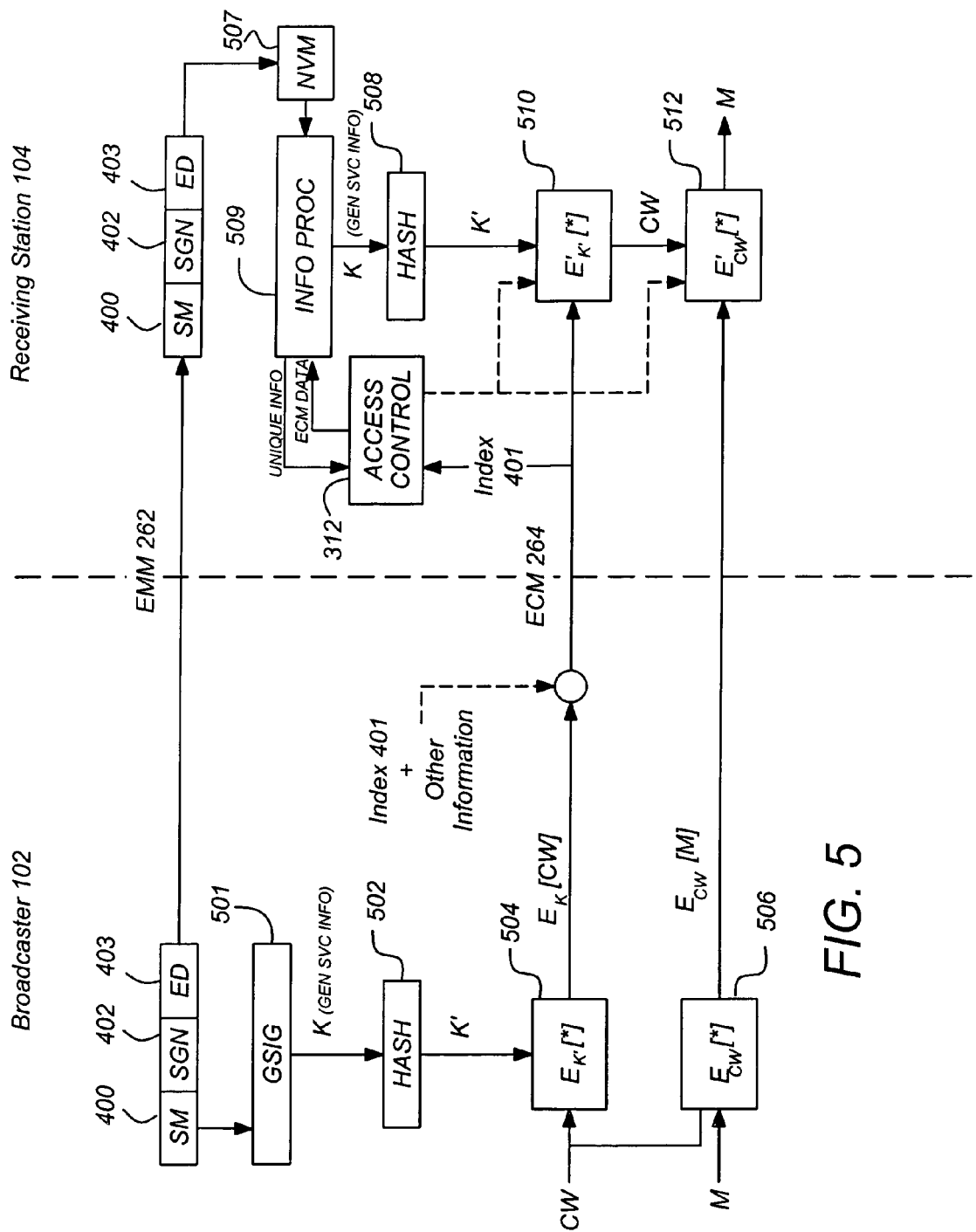
FIG. 5 is a diagram illustrating an embodiment wherein the service bitmap and the key (K) are generated at least in part from one another.

FIG. 5 is a diagram illustrating an embodiment of the invention in which the service bitmap 400 is used to generate the key (K). In this embodiment, the broadcaster 102 uses the service bitmap 400 as an input to a general service information generator (GSIG) 501. The GSIG 501 generates service information including the key (K) that is required by receiver stations to decrypt and present general services. The key (K) is hashed by a hashing processor 502. The hashed version of the key (K) is then used by an encryptor 504 to encrypt the control word ($CW_i$) to generate $E_K[CW_i]$, which, along with the index 401 and other optional information, comprises the ECM 264 that is sent to the receiving station 104. A second encryptor 506 encrypts the media program M according to the control word $CW_i$. This encrypted program material $E_{CW}[M]$ is then sent with the ECM to the receiving station.

The ECM 264 and EMM 262 are typically sent in different data packets of the same data stream that is used to transmit the encrypted program material $E_{CW}[M]$ to the receiving station 104, but this need not be the case. The EMM 262 is also typically transmitted to the receiving station 104 much less frequently than the ECM 264.

The receiving station 104 provides the EMM 262 a non-volatile memory (NVM) 507 where the EMI may be temporarily stored for later use. The information in the EMM 262 is then provided to an information processor 509, which provides subscriber or subscriber group-unique information (e.g. which programs the subscriber has subscribed to) such as the service bitmap 400 to the access controller 312 and general services information (such as the key (K)) to a hashing processor 508.

The access controller 312 hashes the EMI when the STB 110 passes the ECM 264 to the CAM 206. This hash can be incorporated in CW generation to include a real time component in the calculation. The ECMs 264 are received in real time by the receiving station 104. Data fields are extracted from the ECM 264 and passed to the Information Processor 104. The information processor 509 uses the ECM data (which can include the Service ID, access conditions, and/or the date and time) to provide a real time input to the control word (CW) generation process. This can be used to prevent pre-calculation of $CW_s$ in the event that keys delivered in the EMM 262 have been compromised.

The access controller 312 (after verifying the service bitmap 400, if desired, using the optional signature 402) looks up the value of the service bitmap 400 corresponding to the index 401, and from this value as well as the expiration date 403, determines whether to enable the first decryptor 510 to decrypt the encrypted control word $E_K[CW_i]$ in the ECM 264 to recover the control word $CW_i$.

The hashing processor 508 hashes the general service information (including the key (K) 310) to recover the key (K), and provides the key to the first decryptor 510, thus providing the first encryptor with the information required to decrypt the encrypted control word $E_K[CW_i]$ to recover the control word $CW_i$. The control word $CW_i$ is provided to decrypt the encrypted media program $E_{CW}[M]$, which produces the media program M.

In the foregoing embodiment, the access controller 312 provided a command to the first decryptor 510 to control recovery of the control word $CW_i$, however, the access controller 312 may provide a command to the second decryptor 512 or both decryptors 510, 512 to control the recovery of the media program M from the encrypted media program.

Note that in the foregoing embodiment, if the service bitmap 400 has been altered (e.g. by a hacker in order to gain access to a particular service or media program), the proper key (K) will not be recovered by the hashing process 508, and the media program M will not be properly decrypted. Thus, the foregoing embodiment discourages modification of the service bitmap 400.

FIGS. 6A-6D are diagrams illustrating other embodiments of the present invention in which a second key (K2') 602 is used to control the viewing of the media program (M).

Figure 6A:
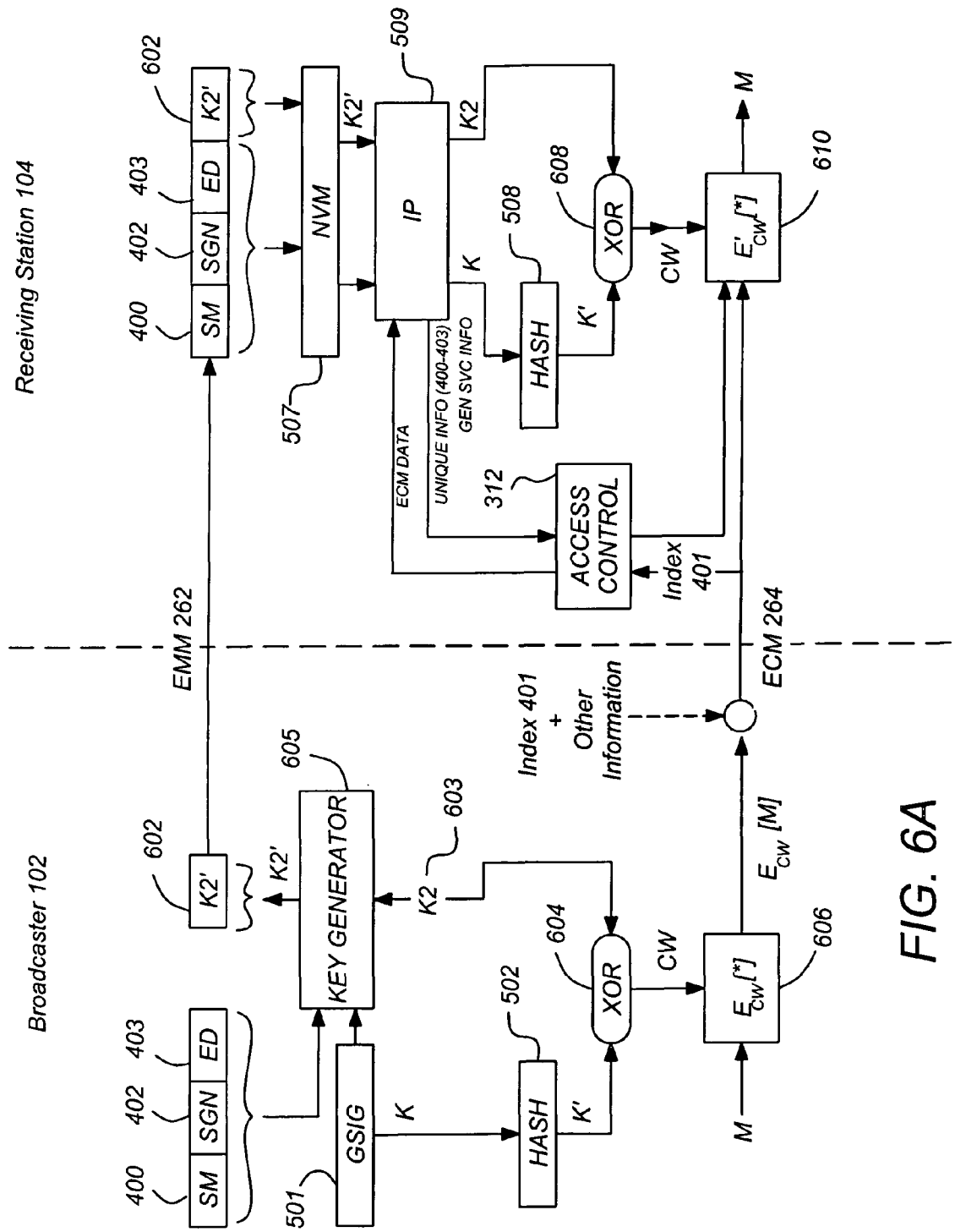
FIGS. 6A-6D are diagrams illustrating an embodiment wherein a second key (K2) is used to control the viewing of a media program (M)

FIG. 6A is a diagram illustrating a first embodiment in which the second key (K2') 602 is used to control the viewing of the media program (M). A key generator 605 generates a key (K2') from EMI including the service bitmap 400 (and optionally, the signature 402 and expiration date 403), general service information including a key (K) from the GSIG 501, and a second key (K2) 603. Key (K2') can be generated from the general service information (K), the EMI, and second key (K2) in a number of ways. In one embodiment, key (K2') is generated by combining key (K) with second key (K2), and combining that result with the EMM. These combinations can include, for example, an exclusive or (XOR) operation. Alternately, the general service information (K) can be combined with the EMM and that result combined with the second key (K2) 603. K2 is cryptographically bound to the EMI and service bitmap. Changes to either the service bitmap or K2 will result in the generation of the wrong control word.

The service bitmap 400 and the key (K2') 602 (and optionally, the signature 402 and expiration date 403) are transmitted to the receiving station 104 as an EMM 262.

The general service information (K) is hashed by a hashing processor 502, and combined with the second key (K2) 603 via combiner 604 to produce the control word $CW_i$. In the illustrated embodiment, the combination processor 604 implements an logical "exclusive or" (XOR) of the hashed version of the service bitmap 400, signature 402, and expiration date 403 and the second key (K2) to produce the control word $CW_i$.

Encryptor 606 encrypts the media program (M) using the control word $CW_i$ to produce the encrypted version of the media program $E_{CW}[M]$. The headend 102 transmits the encrypted media program $E_{CW}[M]$ to the receiving station 104, along with the index 401 and optional other information.

The EMM 262 is received by the receiving station 104 and temporarily stored in NVM 507. The EMI and key (K2') is provided to information processor (IP) 509, which generates the second key (K2) from key (K2'), using a complementary operation to that which was performed by the key generator 605 to generate the key (K2') from the second key (K2). The IP 509 also separates the general service information (K) and the customer or customer group unique information (e.g. service bitmap 400 and optional signature 402 and expiration date 403).

When the subscriber tunes to a channel (selects a channel), an ECM is received by the receiving station 104. The ECM along with the embedded service ID containing the Index 401 is passed to the access controller 312. The unique information related to the Index 401 extracted from the ECM is provided to the access controller 312 from the Info Processor 509. As described above with respect to FIG. 5, the access controller 312 may accept the service bitmap without verification, or may use the signature 402 to verify the service bitmap 400. Depending on the value of the service bitmap 400 corresponding to received index 401, and the expiration date 403, the access controller 312 enables the decryptor 610 to decrypt the encrypted media program $E_{CW}[M]$.

The control word $CW_i$ required to decrypt the encrypted media program $E_{CW}[M]$ obtained by hashing the key (K), and combining the result with the second key (K2) 602, using a second combiner 608. The second combiner 608 is complimentary to that that of the first combiner 604 so that when the second combiner operates on an output of the first combiner 604, the input of the first combiner 604 is recovered. For example, in the illustrated embodiment, the first combiner 604 and second combiner 608 are logical circuits which implement a logical "exclusive OR" (XOR) operation. The result of the combining operation is the control word $CW_i$, which, when provided to the decryptor 610, permits decryption of the encrypted media program $E_{CW}[M]$ to produce the media program (M).

Figure 6B:
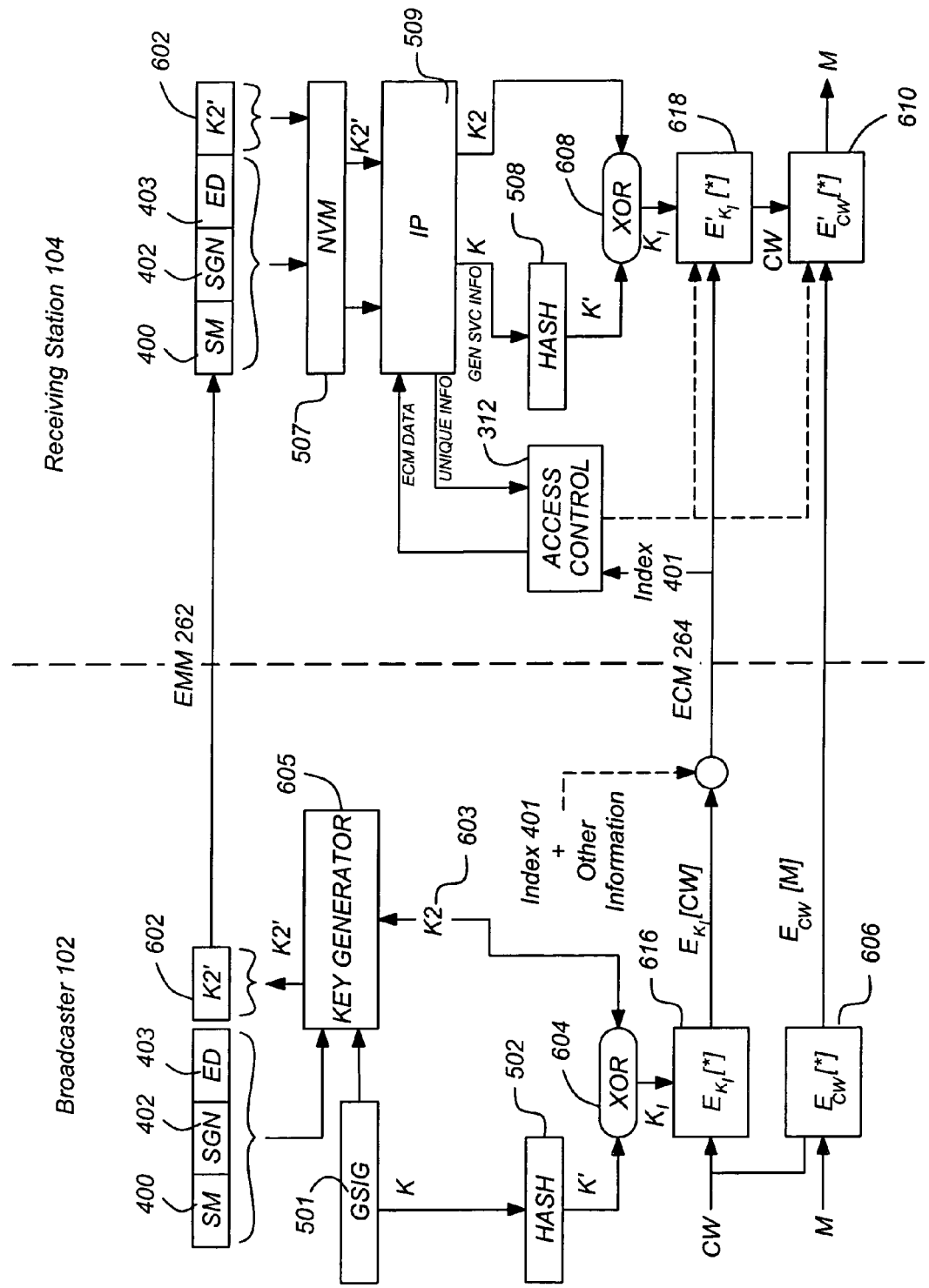

FIG. 6B is a diagram illustrating another embodiment of the invention in which the second key (K2) 603 is used to control the viewing of the media program (M). In this embodiment, key (K2') is generated in the same way as was described with respect to FIG. 6A.

The general service information (K) is optionally hashed by hashing processor 502 to produce a hashed key (K'). The hashed result (K') is combined with the second key (K2) 603 via combiner 604 to produce an intermediate key ($K_I$) that is used to encrypt the control word $CW_i$ that is used to encrypt the media program (M).

The index 401 and optional other information is added to the encrypted control word $E_{K_I}[CW_i]$, and sent to the receiving station 104 in the ECM 264, and the encrypted media program $E_{CW}[M]$ is also sent to the receiving station 104.

The receiving station 104 receives the EMM 262, ECM 264, and the encrypted media program $E_{CW}[M]$. The EMM 262 is provided to a non-volatile memory 507 for temporary storage. Upon receipt of the ECM containing the Index 401 from the channel being viewed by the subscriber, the related EMI data is passed to the information processor 509. Using processes complementary to those employed in the key generator 605. The information processor 509 processes the EMI to generate the general service information (K), second key (K2), and the customer unique service information.

The customer unique service information (service bitmap 400 and optional signature 402 and expiration date 403) is provided to the access controller 312, the key (K) is provided to an optional hashing processor 508, and the second key (K2) is provided to combiner 608.

The hashing processor 508 hashes the key (K), and provides the result to combiner 608. The combiner 608 combines the optionally hashed key (K) and the second key (K2) to regenerate the intermediate key ($K_I$) that was used to generate the encrypted control word $E_{K_I}[CW_i]$ from the control word $CW_i$. Using the key ($K_I$) decryptor 618 generates the control word $CW_i$. The control word $CW_i$ is provided to second decryptor 610 to regenerate the media program (M).

The access controller 312 receives the index 401 from the ECM 264, and the customer unique service information. Using the value of the service bitmap 400 corresponding to the index 401, the access controller 312 determines whether the media program should be presented to the subscriber 112, and according to this determination, controls either one or both of the first and the second decryptors 618 and 610 in order to enable or disable the decryption of the media program (M).

Figure 6C:
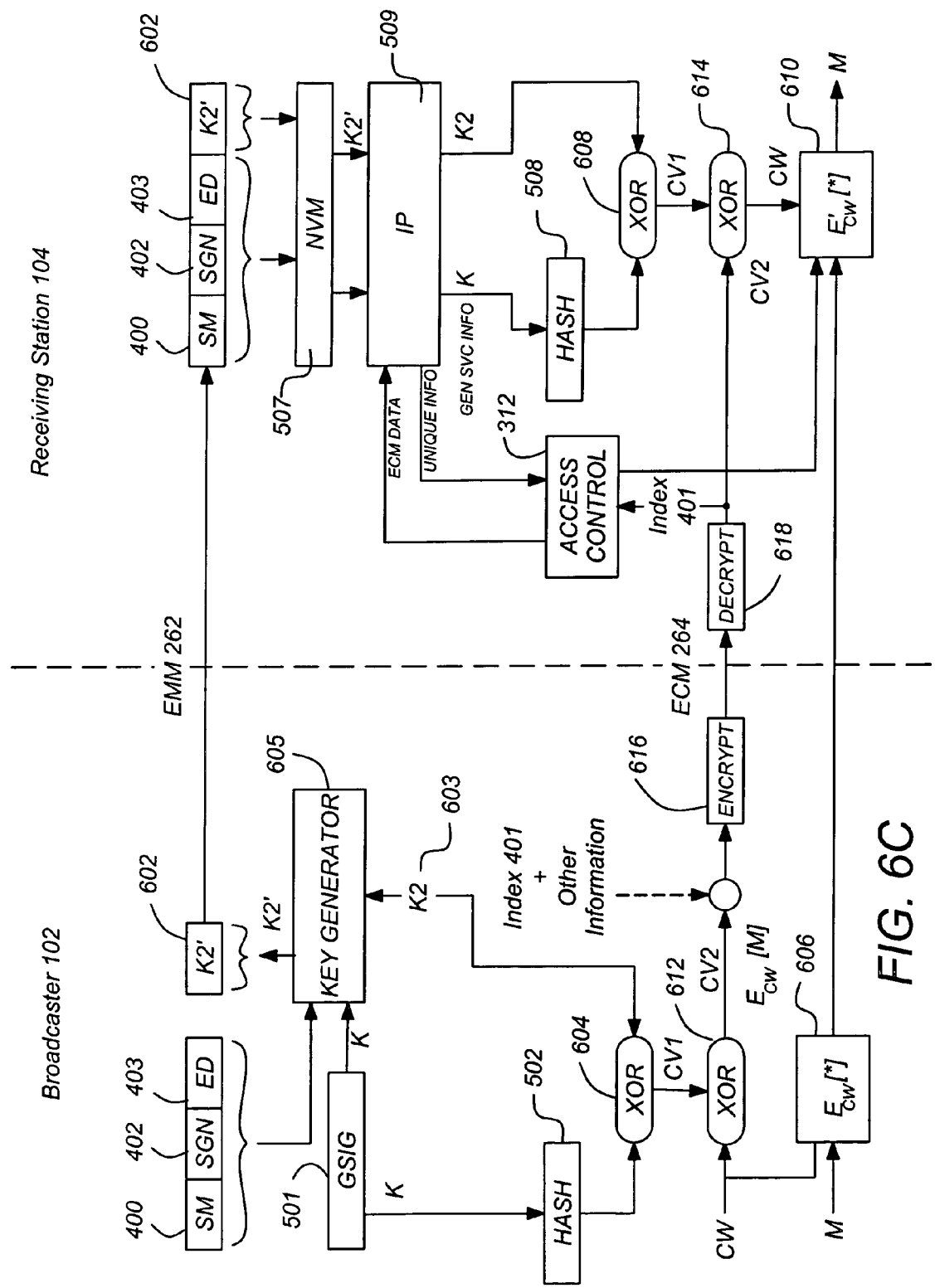

FIG. 6C is a diagram of another embodiment of the invention in which a second key (K2) 603 is used to control the viewing of the media program (M). In this embodiment, a key generator 605 generates a key (K2') from a second key (K2), general service information (K), and EMI (including the service bitmap 400 and optionally, the signature 402 and expiration date 403). Key (K) is hashed by hashing processor 502 and combined with key (K2) to generate a control value CV1.

The control value CV1 is combined with the control word $CW_i$ to produce a second control value CV2 using combiner 612. The index 401 and other optional information is added to the result and transmitted to the receiving station 104 in the form of the ECM 264. To further increase security, the result can be encoded by encoding processor 616 before being transmitted to the receiver station 104. The media program (M) is encrypted according to the control word $CW_i$ by encryptor 606. The result is also transmitted to the receiving station 104.

The receiving station 104 receives the EMM 262 and stores the EMI in NVM 507. Upon receipt of the ECM containing the Index 401 from the channel being viewed by the subscriber, the related EMI data is passed to an information processor 509 which performs operations complementary to that of the key generator 605 to recover the customer unique information (e.g. the service bitmap 400 and optional signature 402 and expiration date 403), the general service information (K), and the second key (K2'). The customer unique information is provided to the access controller 312, key (K) to hashing processor 508, and the second key (K2) to combiner 608. The key (K) is hashed by the hashing processor and combined with the second key (K2) to reproduce the control value CV1. In the illustrated embodiment, the combiner 608 is implemented by a logical XOR circuit or processor. The resulting control value CV1 is used to regenerate the control word $CW_i$.

The receiving station 104 also hashes the ECM 264 with decoding processor 618 (if it was encoded by the broadcaster 102 before transmission to the receiving station 104) to regenerate the second control value CV2. The second control value CV2 and the first control value CV1 are provided to the combiner 614, which implements a function complimentary to that which was performed by combiner 612 in the headend to regenerate the control word $CW_i$. In the illustrated embodiment, both combiner 612 and 614 implement XOR functions. The control word $CW_i$ is provided to decryptor 610, which decrypts the encrypted media program $E_{CW}[M]$.

The receiving station 104 also provides the service bitmap 400 (and optionally, the signature and expiration date 403) to the access controller 312. After optionally verifying the service bitmap 400 using the signature 402, the access controller uses the value of the service bitmap identified by the index 401 received from the ECM 264 (and optionally, the expiration date 403) to determine whether the subscriber 112 should be permitted to view the media program (M). If the subscriber 112 is permitted to do so, the access controller 312 transmits command to instruct the decryptor 610 to decrypt the encrypted media program $E_{CW}[M]$. If the access controller 312 determines that the subscriber 112 is not permitted to access the program, the command is either not transmitted, or a command to prevent the decryptor 610 from decrypting the encrypted media program $E_{CW}[M]$ is transmitted.

Figure 6D:
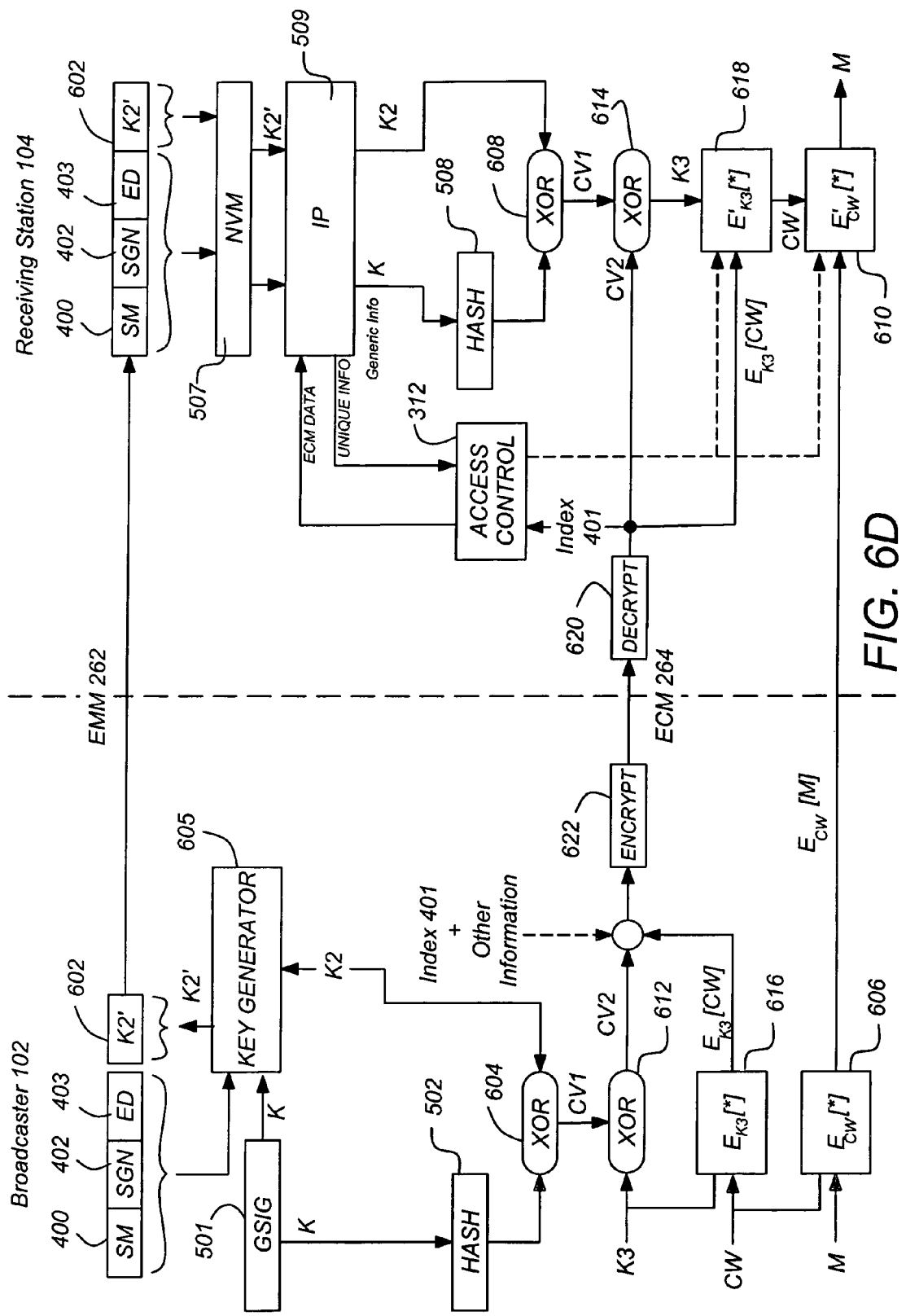

FIG. 6D is a diagram illustrating another embodiment of the invention in which the second key (K2) 603 is used to control the viewing of the media program (M). In this embodiment, a key generator 605 generates a key (K2') from a second key (K2), general service information (K), and EMI (including the service bitmap 400 and optionally, the signature 402 and expiration date 403). Key (K) is hashed by hashing processor 502 and combined with key (K2) to generate a control value CV1. Control value CV1 is combined by combiner 612 with a third key (K3) to generate a second control value CV2.

The control word $CW_i$ is encrypted by encryptor 622 using the third key (K3) to produce the encrypted control word $E_{K3}[CW_i]$. The resulting encrypted control word $E_{K3}[CW_i]$ is combined with the second control value CV2, the index 401, and other optional information, and the result is optionally encoded by encoding processor 616 and transmitted to the receiving station 104 as the ECM 264. In one embodiment, the second control value CV2, the encrypted control word $E_{k3}[CW_i]$, the index 401 and the other information are combined by concatenation before being hashed.

The control word $CW_i$ is then used to encrypt the media program (M) using second encryptor 606. The encrypted media program $E_{CW}[M]$ is transmitted to the receiver station 104.

The receiver station 104 receives the EMM 262, and temporarily stores the EMI in NVM 507. Upon receipt of the ECM and using processes complementary to those used by the key generator 605, the information processor 509 recovers the subscriber unique information (the service bitmap 400 and optional signature 402 and expiration date 403), key (K) and second key (K2). The subscriber unique information is provided to the access controller 312, the key (K) is provided to hashing processor 508, and the second key (K2) is provided to combiner 608. The hashing processor 508 hashes the key (K), and the result is combined with the second key (K2) by combiner 608 to reproduce the first control variable CV1.

The receiving station 104 receives the ECM 264, and uses decoding processor 618 to recover the index 401, encrypted control word $E_{K3}[CW_i]$ and other information. The index 401 is provided to the access controller 312, the second control value CV2 is provided to a second combiner 614, and the encrypted control word $E_{K3}[CW_i]$ is provided to decryptor 620.

The receiving station 104 recovers the third key (K3) by combining the first control value CV1 and the second control value CV2 with combiner 614, and provides the recovered third key (K3) to decryptor 620. The decryptor 620 decrypts the encrypted control word $E_{K3}[CW_i]$ to recover the control word $CW_i$, which is provided to second decryptor 610. The second decryptor then decrypts the encrypted media program $E_{CW}[M]$ to produce the media program (M).

The access controller 312 controls the operation of the first decryptor 620 and/or the second decryptor 610 so that the media program (M) is only decrypted when indicated by the indexed value of the service bitmap 400 and optionally, the expiration date 403.

Each of the embodiments illustrated in FIGS. 6A-6D includes complementary hashing processors 502 and 508. Each of these embodiments can be implemented without such hashing processors as well.

System Architecture

Figure 7:
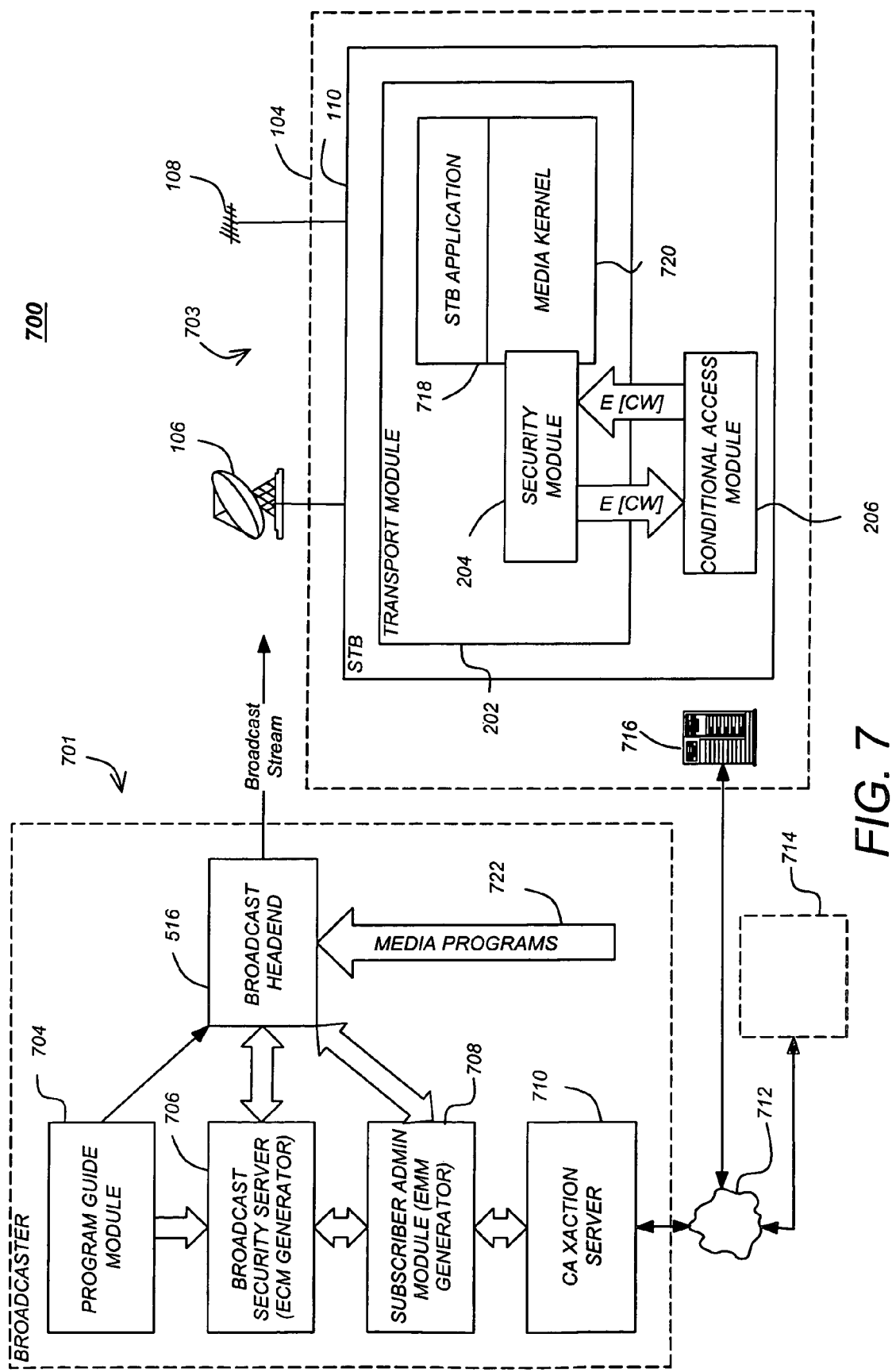
FIG. 7 is a diagram of a conditional access system architecture.

FIG. 7 is a diagram of a conditional access system 700 that can be used to transmit the EMM 262 and the ECM 264 to the receiving stations 104. The conditional access system 700 includes a broadcaster segment 701 and a receiver segment 703.

The broadcasters segment 701 includes a broadcast headend 516 that is communicatively coupled to a program guide module 704, a broadcast security server 706, and a subscriber administration module 708 to control subscriber 112 access to the media programs 722.

The subscriber administration module (SAM) 708 generates the service bitmap 400 as described above, and provides it to the broadcast headend 516 for assembly into the broadcast data stream transmitted to the receiver station 104. The SAM 708 also controls the rate at which EMMs 262 are inserted into the broadcast stream. The SAM 708 also adds, deletes, and modifies authorized programming for the subscriber 112, controls the subscriptions, and handles service renewal requests. Subscriptions include pay-per-view events such as order ahead pay-per-view (OPPV) and impulse pay-per-view (IPPV) events. Unlike OPPV events, IPPV events do not require transmission of individual authorization messages.

The broadcast security server (BSS) 706 generates the ECM 264, and performs the hashing, combining, and/or encrypting operations required to generate both the EMM 262 and the ECM 264.

The broadcaster segment transmits EMM 262 and ECM 264 messages to the receiver segment 703 to the STB application 718 and media kernel 720, where processing is performed to determine which services should be provided to the subscriber.

The receiver segment 703 includes a receiver station 104 having an STB 110. The STB 110 includes a transport module 202, which handles the flow of the received broadcast data stream within the STB 110. The transport module 202 also includes an STB application 718 interfacing with a conditional access module 206 via a media kernel 720 and a security module 204. In one embodiment, the conditional access module 206 is a smart card having a security chip that can be removably inserted into the STB 110.

As described above with respect to FIG. 4, the conditional access module uses the EMM 262 and ECM 264 to limit media program access to subscribers. While the media kernel and STB application are illustrated as being part of the transport module 202, they may be incorporated into the conditional access module 206 or any part of the STB 110.

Users subscribe to the media service by providing STB identifying information to the conditional access system 700. This can be accomplished via a computer 716 at the receiver station. In one embodiment, the user uses an Internet browser executing on the computer 716 to enter STB 110 identifying information. The information is transmitted to the broadcaster 102 via the Internet 712. This can also be accomplished by calling a broadcaster customer service representative, or by any other means known in the art. Web-based authorization is the preferred method of accepting service requests because it requires little or no human intervention between the transaction server 710 and the subscriber 112. The subscriber 112 can subscribe to a wide variety of services, including ordinary subscription services, pay-per-view (PPV) media programs, select any order ahead pay-per-view (OPPV) media programs, and impulse pay-per-view (IPPV) media programs. Billing for those services can be accomplished via a third party 714 such as PAYPAL or a credit card agency. The subscriber 112 can also pre-authorize a credit that can be sent to the conditional access module 206. The subscriber 112 can repeat this process for each media program or group of media programs that they would like to receive.

The conditional access transaction server 710 accepts this information and initiates activation of the service by providing the information to the subscriber administration module 708. An activation component controls the activation of the conditional access module 206/STB 110 pairs, and keeps track of such pairings to assure integrity.

Virtual Group Distribution of EMMs to Fielded CAMs

In one embodiment, the present invention also allows efficient distribution of EMMs 262 to deployed CAMs 206 (already provided to subscribers 112 and installed into STBs 110). This is accomplished by defining "virtual groups" of CAMs 206 that should receive the EMMs 262. Data defining virtual groups can be pre-loaded into the CAMs 206 provided to new subscribers 112, or can be loaded into the CAM 206 by a data packet in a manner similar to that which is used to transmit EMMs 262 to the CAM 206. Once the group data is stored in the CAM 206, it can be sent to the media kernel 720. Upon power up (or insertion of the CAM 206 into the STB 110), the group identifier and the CAM 206 identifier are passed from the CAM 206 to the media kernel 720 and the media kernel 720 uses that information to determine whether an EMM 262 transmitted in the program stream should be provided to the CAM 206. The EMM's header 324 can be used to identify the EMM 262 so that the media kernel 720 can identify the EMM 262 as a "group" EMM 262 that should be provided to the CAM 206. Virtual groups can therefore be used to efficiently distribute group EMMs, thus saving bandwidth within the broadcast infrastructure because individually addressed EMMS are not required. Broadcasting to legacy groups become less effective as the card population ages and legacy groups be come more sparse. Legacy groups become sparse because subscribers churn out and cards fail or become damaged. Since the broadcaster 102 has knowledge of which CAMs 206 belong to which groups, the broadcaster 102 can optimally define the virtual groups to minimize transmission and memory requirements.

Figure 8:
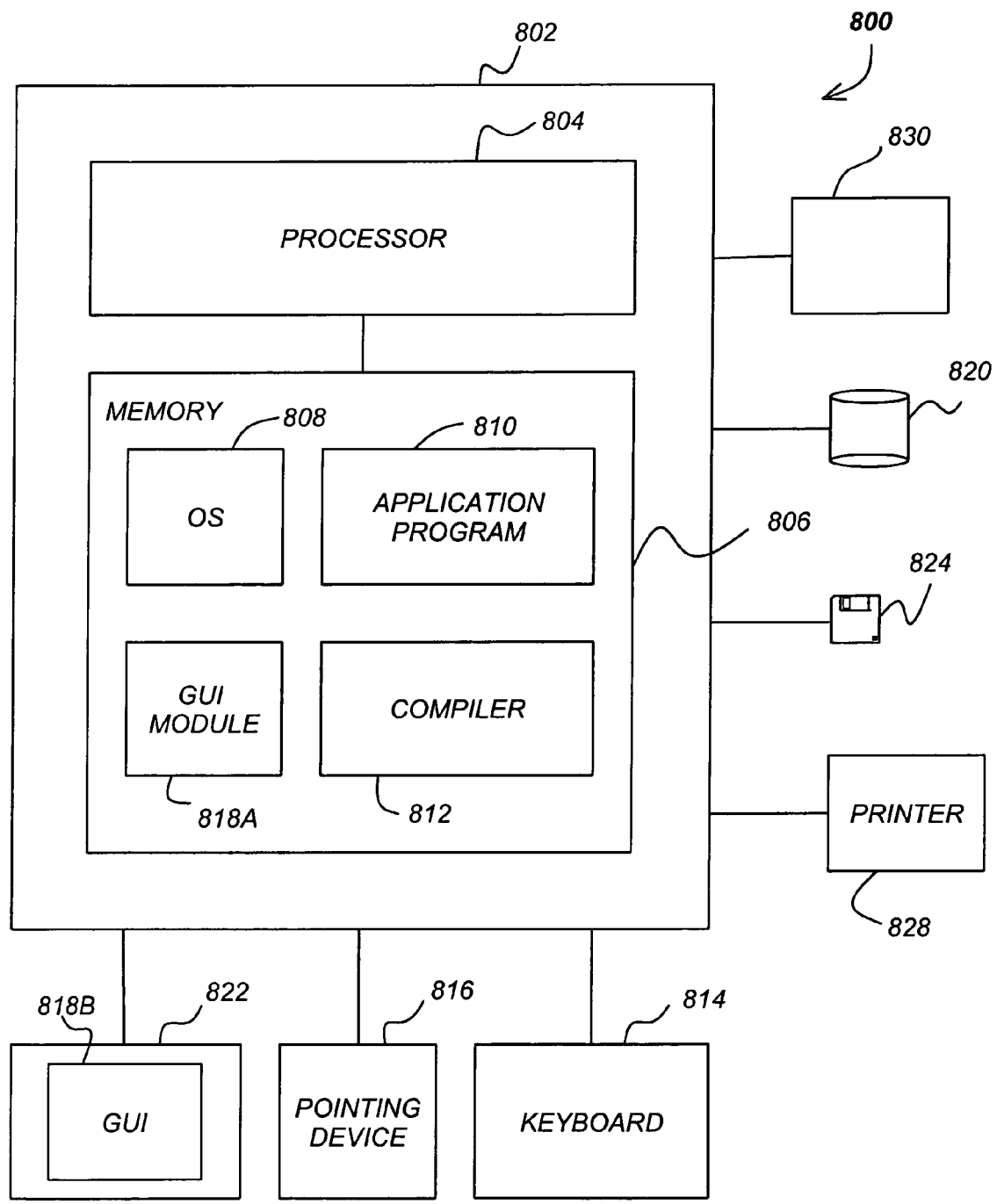
FIG. 8 illustrates an exemplary computer system 800 that could be used to implement the present invention.

FIG. 8 illustrates an exemplary computer system 800 that could be used to implement the present invention. The computer 802 comprises a processor 804 and a memory, such as random access memory (RAM) 806. The computer 802 is operatively coupled to a display 822, which presents images such as windows to the user on a graphical user interface 818B. The computer system 802 may be coupled to other devices, such as a keyboard 814, a pointing device 816, a printer 828, etc. Of course, those skilled in the art will recognize that any combination of the above components, or any number of different components, peripherals, and other devices, may be used with the computer 802.

Generally, the computer 802 operates under control of an operating system 808 stored in the memory 806, and interfaces with the user to accept inputs and commands and to present results through a graphical user interface (GUI) module 818A. Although the GUI module 818A is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as COBOL, C++, FORTRAN, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of instructions which, when read and executed by the computer 802, causes the computer 802 to perform the steps necessary to implement and/or use the present invention. Computer program 810 and/or operating instructions may also be tangibly embodied in memory 806 and/or data communications devices 830, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing conditional access to a media program of a plurality of media programs, comprising the steps of:

transmitting media information encrypted according to a control word (CW) from a headend to a receiver station;

transmitting an entitlement management message (EMM) comprising entitlement management information (EMI) from the headend to the receiver station, the EMI comprising a service bitmap indicating entitlements to a plurality of programs;

generating a processed second key (K2') from a second key (K2), the service bitmap, and a key (K);

transmitting the processed second key (K2') to the receiver station; and transmitting an entitlement control message (ECM) comprising entitlement control information (ECI) to the receiver station, the entitlement control information including the control word (CW) encrypted according to the key (K) and a service identifier having an index to an element of the service bitmap;

wherein the receiver station regenerates the key (K) and the second key (K2) from the processed second key (K2') and the service bitmap, and regenerates the control word (CW) from the regenerated key (K) and the regenerated second key (K2).

2. The method of claim 1, wherein the media information, the EMI and the ECI are transmitted in a single time division multiple access (TDMA) data stream.

3. The method of claim 1, wherein the service bitmap comprises an array of elements, each element of the array of elements associated with at least one media service and comprising a bit.

4. The method of claim 1, wherein the service bitmap comprises an array of elements, each element of the array of elements associated with at least one media program and comprising a bit.

5. The method of claim 1, wherein:
the EMI further comprises an expiration and the EMI is signed according to a signature transmitted with the EMI.

6. The method of claim 1, wherein the ECM further comprises access control information and the access control information and the control word (CW) are together encrypted according to the key (K).

7. The method of claim 1, wherein the receiver station regenerates the key (K) using the service bitmap transmitted with the EMI.

8. The method of claim 1, wherein the receiver station regenerates the control word (CW) using the regenerated key (K) and the regenerated second key (K2) by performing steps comprising:
regenerating the key (K) and the second key (K2);
combining the regenerated key (K) and the regenerated second key (K2) to produce the control word (CW).

9. The method of claim 1, wherein the control word (CW) is encrypted according to an intermediate key (KI) generated from the key (K) and the second key (K2); and wherein the receiver station regenerates the control word (CW) using the regenerated key (K) and the regenerated second key (K2) by performing steps comprising:
combining the regenerated key (K) and the regenerated second key (K2) to regenerate the intermediate key (KI); and
decrypting the encrypted control word (CW) using the regenerated intermediate key (KI).

10. The method of claim 1, wherein:
the receiver station regenerates the control word (CW) using the key (K) and the second key (K2) by performing steps comprising:
regenerating the key (K) and the second key (K2);
combining the key (K) and the second key (K2) to produce a first control value (CV1); and
combining the first control value (CV1) and a second control value (CV2) to generate the control word (CW);
wherein the second control value (CV2) is generated as a combination of the control word (CW) and a combination of the key (K) and the second key (K2) before transmission to the receiver station.

11. An apparatus for providing conditional access to a media program of a plurality of media programs, comprising:
a hardware apparatus;
means, performed by the hardware apparatus, for transmitting media information encrypted according to a control word (CW) from a headend to a receiver station;
means, performed by the hardware apparatus, for transmitting entitlement management information (EMI) from the headend to the receiver station, the EMI comprising a service bitmap indicating entitlements to a plurality of programs;
means, performed by the hardware apparatus, for generating a processed second key (K2') from a second key (K2), the service bitmap, and a key (K);
means, performed by the hardware apparatus, for transmitting the processed second key (K2') to the receiver station; and
means, performed by the hardware apparatus, for transmitting entitlement control information (ECI) to the receiver station, the entitlement control information including the control word (CW) encrypted according to the key (K) and a service identifier having an index to an element of the service bitmap;
wherein the receiver station regenerates the key (K) and the second key (K2) from the processed second key (K2') and the service bitmap, and regenerates the control word (CW) from the regenerated key (K) and the regenerated second key (K2).

12. The apparatus of claim 11, wherein the media information, the EMI and the ECI are transmitted in a single time division multiple access (TDMA) data stream.

13. The apparatus of claim 11, wherein the service bitmap comprises an array of elements, each element of the array of elements associated with at least one media service and comprising a bit.

14. The apparatus of claim 11, wherein the service bitmap comprises an array of elements, each element of the array of elements associated with at least one media program and comprising a bit.

15. The apparatus of claim 11, wherein:
the EMI further comprises an expiration and the EMI is signed according to a signature transmitted with the EMI.

16. The apparatus of claim 11, wherein:
the entitlement management information (EMI) is transmitted in an entitlement management message (EMM); and
the entitlement control information (ECI) is transmitted in an entitlement control message (ECM).

17. The apparatus of claim 16, wherein the ECM further comprises access control information and the access control information and the control word (CW) are together encrypted according to the key (K).

18. The apparatus of claim 11, wherein the receiver station regenerates the key (K) using the service bitmap transmitted with the EMI.

19. The apparatus of claim 11, wherein the receiver station regenerates the control word (CW) using the regenerated key (K) and the regenerated second key (K2) by regenerating the key (K) and the second key (K2) and combining the regenerated key (K) and the regenerated second key (K2) to produce the regenerated control word (CW).

20. The apparatus of claim 11, wherein:
the control word (CW) is encrypted by an intermediate key (KI); and
the receiver station regenerates the control word (CW) using the regenerated key (K) and the regenerated second key (K2) by regenerating the key (K) and the second key (K2), combining the regenerated key (K) and the regenerated second key (K2) to regenerate the intermediate key (KI), and decrypting the encrypted control word using the regenerated intermediate key (KI).

21. The apparatus of claim 11, wherein:
the receiver station regenerates the control word (CW) using the regenerated key (K) and the second key (K2)

by regenerating the key (K) and the second key (K2), combining the key (K) and the second key (K2) to produce a first control value (CV1), and combining the first control value (CV1) and a second control value (CV2) to generate the control word (CW); and wherein the second control value (CV2) is generated as a combination of the control word (CW) and a combination of the key (K) and the second key (K2) before transmission to the receiver station.

22. An apparatus for providing conditional access to a media program of a plurality of media programs, comprising:
   a first encryptor for encrypting media information according to a control word (CW);
   a second encryptor for encrypting the control word according to a key (K);
   a processor for generating entitlement management information (EMI), including a service bitmap indicating entitlements to a plurality of programs, and for generating entitlement control information (ECI) including the encrypted control word (CW) and a service identifier having an index to an element of the service bitmap;
   a key generator for generating a processed second key (K2') from a second key (K2), the service bitmap, and the key (K);
   a transmitter for transmitting the service bitmap and the processed second key (K2') to the receiver station; and
   a transmitter for transmitting the entitlement management information (EMI) in a first message and for transmitting the entitlement control information (ECI) in a second message from a headend to a receiver station;
   wherein the receiver station regenerates the key (K) and the second key (K2) from the processed second key (K2') and the service bitmap, and regenerates the control word (CW) from the regenerated key (K) and the regenerated second key (K2).

23. The apparatus of claim 22, the EMI and the ECI are transmitted in a single time division multiple access (TDMA) data stream.

24. The apparatus of claim 22, wherein the service bitmap comprises an array of elements, each element of the array of elements associated with at least one media service and comprising a bit.

25. The apparatus of claim 22, wherein the service bitmap comprises an array of elements, each element of the array of elements associated with at least one media program and comprising a bit.

26. The apparatus of claim 22, wherein:
   the EMI further comprises an expiration and the EMI is signed according to a signature transmitted with the EMI.

27. The apparatus of claim 22, wherein:
   the entitlement management information (EMI) is transmitted in an entitlement management message (EMM); and
   the entitlement control information (ECI) is transmitted in an entitlement control message (ECM).

28. The apparatus of claim 27, wherein the ECM further comprises access control information and the access control information and the control word (CW) are together encrypted according to the key (K).

29. The apparatus of claim 22, wherein the receiver station regenerates the key (K) using the service bitmap transmitted with the EMI.

30. The apparatus of claim 22, wherein the receiver station regenerates the control word (CW) using the regenerated key (K) and the regenerated second key (K2) by regenerating the key (K) and the second key (K2) and combining the regenerated key (K) and the regenerated second key (K2) to produce the control word (CW).

31. The apparatus of claim 22, wherein:
   the control word (CW) is encrypted by an intermediate key (KI); and
   the receiver station regenerates the control word (CW) using the regenerated key (K) and the regenerated second key (K2) by regenerating the key (K) and the second key (K2), combining the regenerated key (K) and the second key (K2) to regenerate the intermediate key (KI), and decrypting the encrypted control word using the regenerated intermediate key (KI).

32. The apparatus of claim 22, wherein:
   the receiver station regenerates the control word (CW) using the regenerated key (K) and the regenerated second key (K2) by regenerating the key (K) and the second key (K2), combining the regenerated key (K) and the regenerated second key (K2) to produce a first control value (CV1), and combining the first control value (CV1) and a second control value (CV2) to generate the control word (CW); and
   wherein the second control value (CV2) is generated as a combination of the control word (CW) and a combination of the key (K) and the second key (K2) before transmission to the receiver station.

33. A method for providing conditional access to a media program of a plurality of media programs, comprising the steps of:
   transmitting media information encrypted according to a control word (CW) from a headend to a receiver station;
   transmitting entitlement management information (EMI) from the headend to the receiver station, the EMI comprising a service bitmap indicating entitlements to a plurality of programs;
   transmitting entitlement control information (ECI) to the receiver station, the entitlement control information including a service identifier having an index to an element of the service bitmap;
   generating a processed second key (K2') from a second key (K2), the service bitmap, and a key (K) and transmitting the processed second key to the receiver station;
   regenerating the key (K) and the second key (K2) from the processed second key (K2') and the service bitmap; and
   regenerating the control word (CW) from the regenerated key (K) and the regenerated second key (K2).

34. The method of claim 33, wherein the step of regenerating the control word (CW) using the regenerated key (K) and the regenerated second key (K2) comprises the steps of:
   combining the regenerated key (K) and the second key (K2) to produce the control word (CW).

35. The method of claim 33, wherein the control word (CW) is encrypted according to an intermediate key (KI) generated from the key (K) and the second key (K2); and wherein the step of regenerating the control word (CW) using the regenerated key (K) and the regenerated second key (K2) comprises the steps of:
   combining the regenerated key (K) and the regenerated second key (K2) to produce the regenerated intermediate key (KI); and
   decrypting the encrypted control word (CW) using the regenerated intermediate key (KI).

36. The method of claim 33, wherein:
   the step of regenerating the control word (CW) using the key (K) and the second key (K2) comprises the steps of:
   regenerating the key (K) and the second key (K2);

combining the key (K) and the second key (K2) to produce a first control value (CV1); and combining the first control value (CV1) and a second control value (CV2) to generate the control word (CW);

wherein the second control value (CV2) is generated as a combination of the control word (CW) and a combination of the key (K) and the second key (K2) before transmission to the receiver station.

37. An apparatus for providing conditional access to a media program of a plurality of media programs, comprising:

a hardware apparatus;

means, performed by the hardware apparatus, for transmitting media information encrypted according to a control word (CW) from a headend to a receiver station;

means, performed by the hardware apparatus, for transmitting entitlement management information (EMI) from the headend to the receiver station, the EMI comprising a service bitmap indicating entitlements to a plurality of programs; and means, performed by the hardware apparatus, for transmitting entitlement control information (ECI) to the receiver station, the entitlement control information including a service identifier having an index to an element of the service bitmap;

means, performed by the hardware apparatus, for generating a processed second key (K2') from a second key (K2), the service bitmap, and a key (K) and transmitting the processed second key to the receiver station;

means, performed by the hardware apparatus, for regenerating the key (K) and the second key (K2) from the processed second key (K2') and the service bitmap; and means, performed by the hardware apparatus, for regenerating the control word (CW) from the regenerated key (K) and the regenerated second key (K2).

38. The apparatus of claim 37, wherein the means for regenerating the control word (CW) using the regenerated key (K) and the regenerated second key (K2) comprises:

means for combining the key (K) and the second key (K2) to produce the control word (CW).

39. The apparatus of claim 37, wherein:

the control word (CW) is encrypted according to an intermediate key (KI) generated from the key (K) and the second key (K2); and wherein the means for regenerating the control word (CW) using the regenerated key (K) and the regenerated second key (K2) comprises:

means, performed by the hardware apparatus, for combining the regenerated key (K) and the regenerated second key (K2) to produce the regenerated intermediate key (KI); and means, performed by the hardware apparatus, for decrypting the encrypted control word (CW) using the regenerated intermediate key (KI).

40. The apparatus of claim 37, wherein:

the means for regenerating the control word (CW) using the key (K) and the second key (K2) comprises:

means, performed by the hardware apparatus, for regenerating the key (K) and the second key (K2);

means, performed by the hardware apparatus, for combining the key (K) and the second key (K2) to produce a first control value (CV1) means, performed by the hardware apparatus, for combining the first control value (CV1) and a second control value (CV2) to generate the control word (CW); and wherein the second control value (CV2) is generated as a combination of the control word (CW) and a combination of the key (K) and the second key (K2) before transmission to the receiver station.

41. An apparatus for providing conditional access to a media program of a plurality of media programs, comprising:

a first encryptor for encrypting media information according to a control word (CW);

a first processor for generating entitlement management information (EMI), including a service bitmap indicating entitlements to a plurality of programs and for generating entitlement control information (ECI) including a service identifier having an index to an element of the service bitmap, and for generating a processed second key (K2') from a second key (K2), the service bitmap, and a key (K) and transmitting the processed second key to the receiver station; and a transmitter for transmitting the entitlement management information (EMI) and the processed second key (K2') in a first message and for transmitting the entitlement control information (ECI) in a second message from a headend to a receiver station;

a second processor for regenerating the key (K) and the second key (K2) from the processed second key (K2') and the service bitmap and for regenerating the control word (CW) from the regenerated key (K) and the regenerated second key (K2).

* * * * *